United States Patent [19]

Sepso et al.

[11] Patent Number: 4,789,850

[45] Date of Patent: Dec. 6, 1988

[54] TEMPERATURE SENSOR CONSTRUCTION AND METHOD OF MAKING THE SAME

[75] Inventors: Roger P. Sepso, Stratford; Charles J. Everett, Killingworth, both of Conn.

[73] Assignee: Robertshaw Controls Company, Richmond, Va.

[21] Appl. No.: 129,786

[22] Filed: Dec. 7, 1987

[51] Int. Cl.⁴ .............................................. H01C 3/04
[52] U.S. Cl. .................................... 338/25; 338/22 R; 29/612
[58] Field of Search ................. 338/25, 22 R, 22 SD, 338/13, 7; 374/208, 209, 210; 29/612

[56] References Cited

U.S. PATENT DOCUMENTS

| | | | |
|---|---|---|---|
| 3,340,490 | 9/1967 | Obenhaus | 338/25 X |
| 3,479,631 | 11/1969 | Harget et al. | 338/25 X |
| 3,521,212 | 7/1970 | Waseleski et al. | 338/25 |
| 3,537,053 | 10/1970 | Snoberger et al. | 338/25 |
| 3,646,494 | 2/1972 | Waseleski et al. | 338/25 |
| 3,967,229 | 6/1976 | Vind | 338/13 |

Primary Examiner—E. A. Goldberg
Assistant Examiner—M. M. Lateef
Attorney, Agent, or Firm—Candor, Candor & Tassone

[57] ABSTRACT

A temperature sensor construction and method of making the same are provided, the temperature sensor construction comprising a thermistor having opposed sides, a pair of conductors respectively secured to the opposed sides of the thermistor and having portions thereof extending away from the thermistor, an electrically insulating member having an opening therethrough and telescopically receiving the thermistor in the opening thereof, the insulating member having an outer peripheral edge, a pair of metallic foil members disposed on the opposed sides of the thermistor and being insulated from each other by the insulating member, and two outer layers of electrically insulating material secured to each other and encapsulating the foil members and the conductors and the insulating member and the thermistor therebetween, the opening in the insulating member having a portion thereof that extends to and interrupts the peripheral edge thereof, one of the conductors having a portion thereof disposed within the portion of the opening.

20 Claims, 3 Drawing Sheets

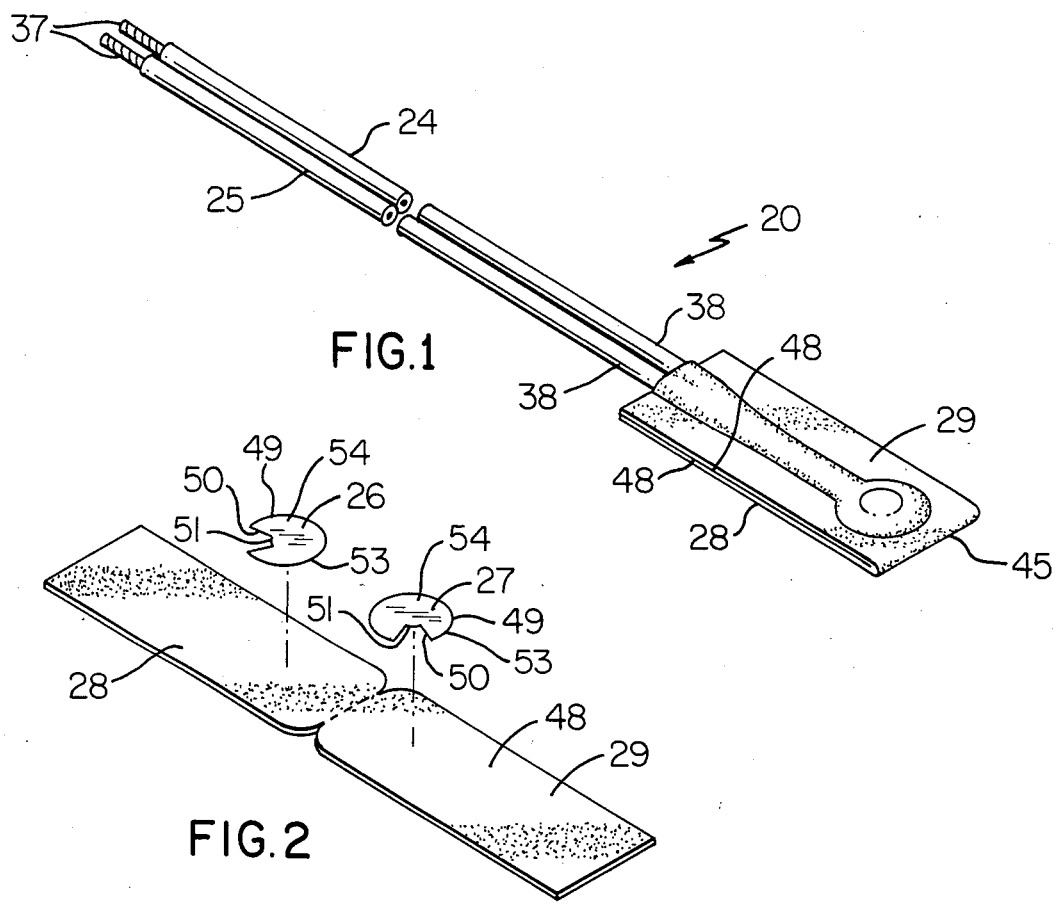
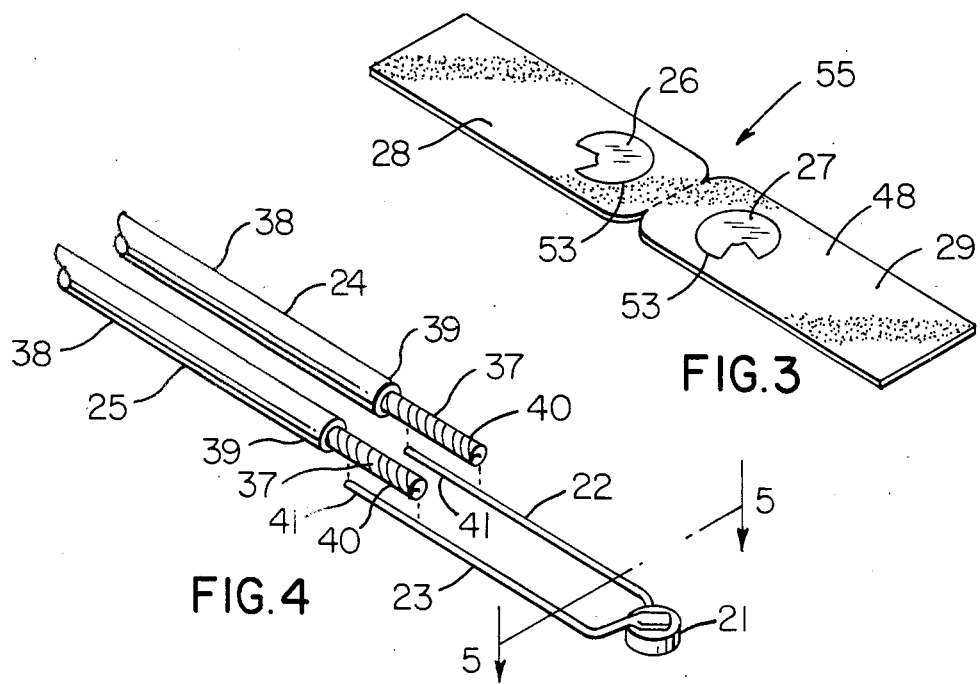

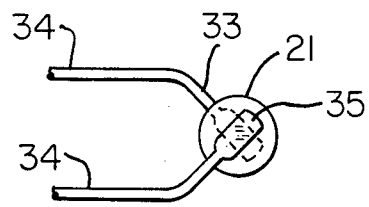
FIG. 5
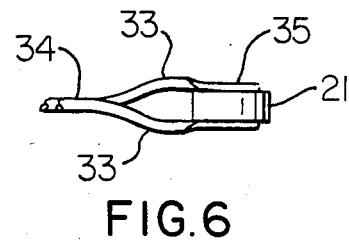
FIG. 6
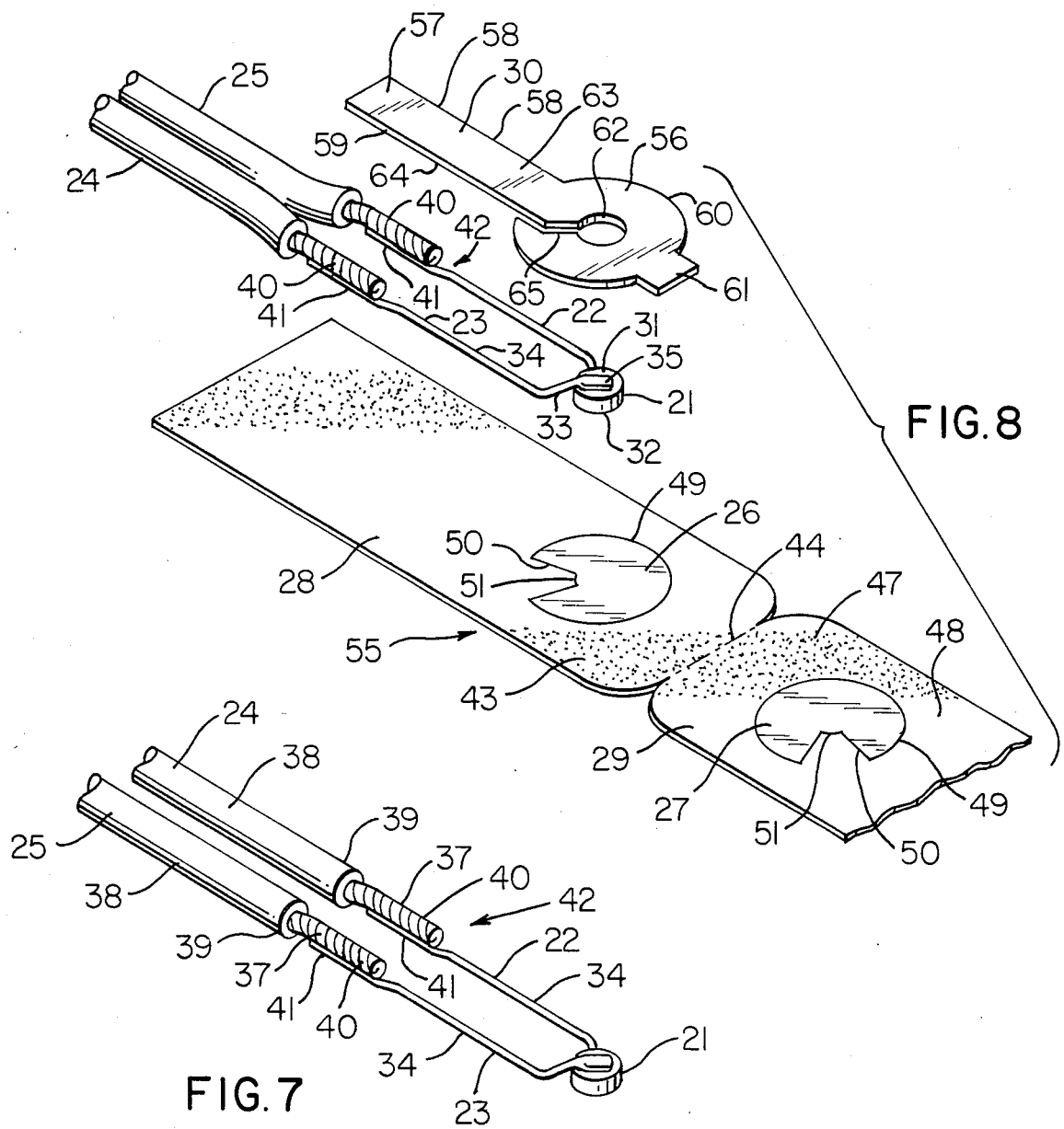
FIG. 7
FIG. 8

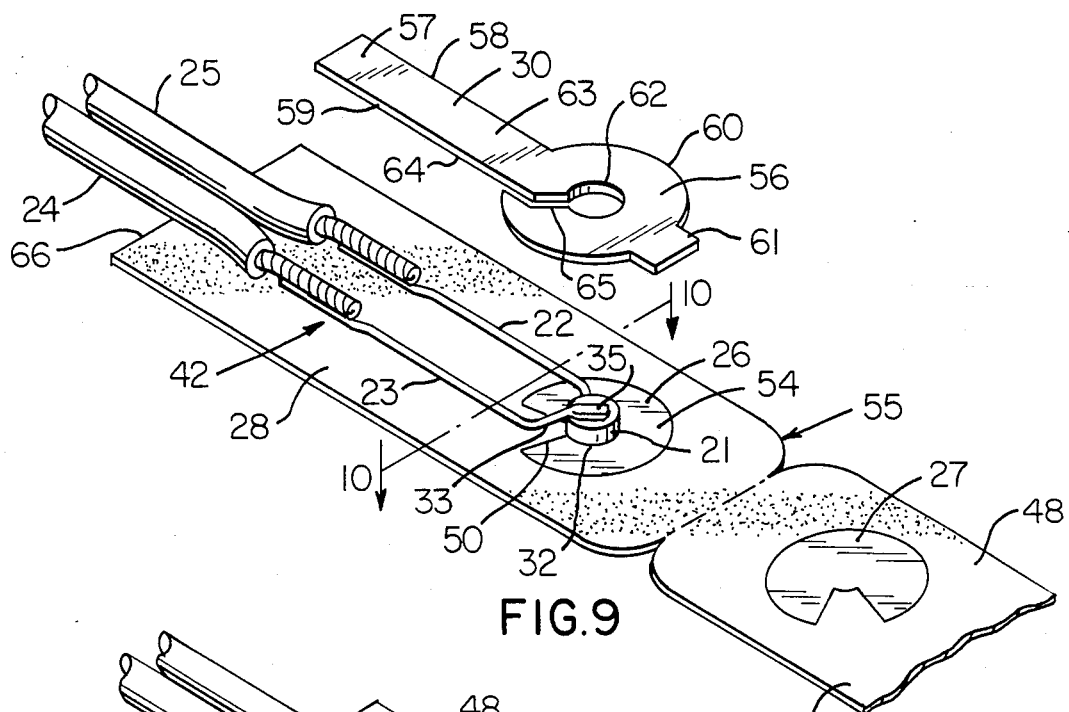
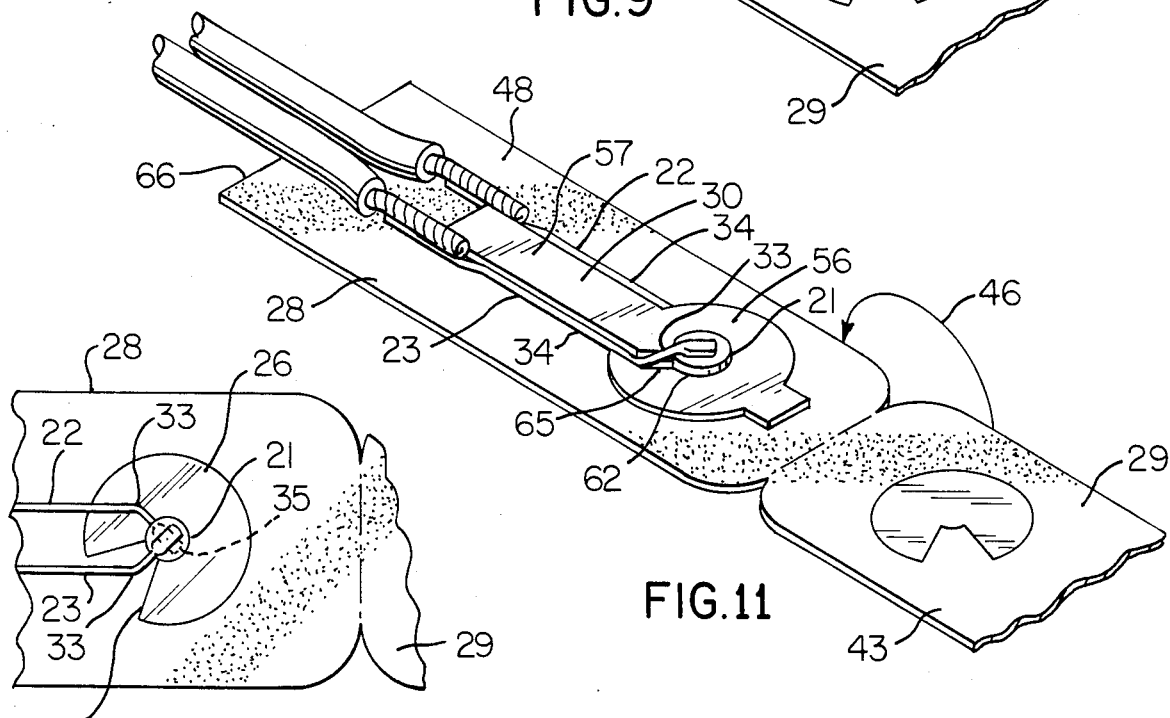
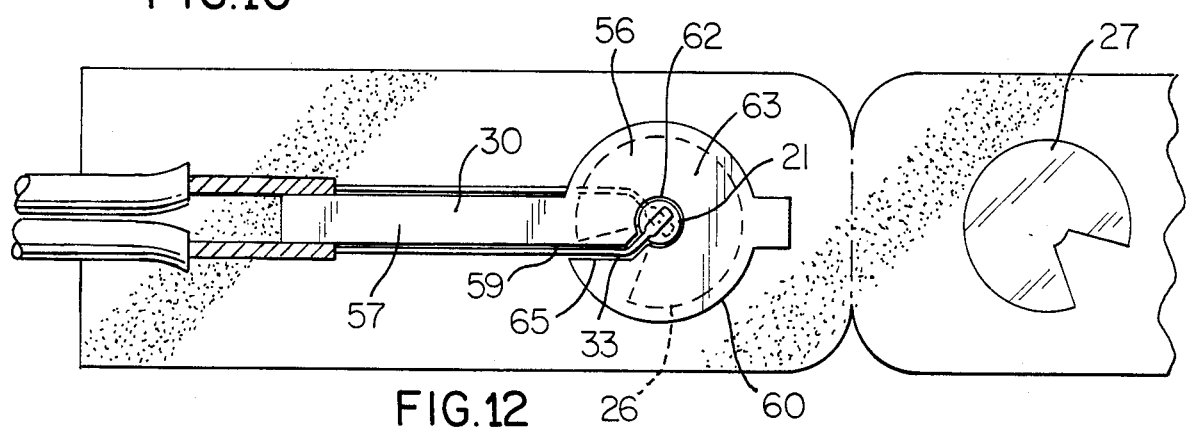

TEMPERATURE SENSOR CONSTRUCTION AND METHOD OF MAKING THE SAME

BACKGROUND OF THE INVENTION

1. Field of the Invention

This invention relates to a new temperature sensor construction and to a new method of making such a temperature sensor construction.

2. Prior Art Statement

It is known to provide a temperature sensor construction comprising a thermistor having opposed sides, a pair of conductors respectively secured to the opposed sides of the thermistor and having portions thereof extending away from the thermistor, an electrically insulating member having an opening means therethrough and telescopically receiving the thermistor in the opening means thereof, the insulating member having an outer peripheral edge means, a pair of metallic foil members disposed on the opposed sides of the thermistor and being insulated from each other by the insulating member, and two outer layers of electrically insulating material secured to each other and encapsulating the foil members, the conductors, the insulating member and the thermistor therebetween. For example, see the U.S. Pat. No. 3,646,494, to Waseleski, Jr., and the U.S. Pat. No. 3,521,212, to Waseleski, Jr.

SUMMARY OF THE INVENTION

It is one feature of this invention to provide a new temperature sensor construction wherein the conductors for the thermistor thereof and the insulating member for the conductors are uniquely arranged.

In particular, it was found according to the teachings of this invention that the insulating member in a temperature sensor construction and which is utilized to electrically insulate the conductors from each other as well as have an opening means therein for receiving the thermistor therein can be uniquely shaped to permit the conductors to be disposed in side-by-side relation and be assembled in a simple manner with the thermistor after the conductors have been preassembled with the thermistor to form a subassembly thereof. This features is accomplished by extending a portion of the opening means of the insulating member to the peripheral edge means thereof so that one of the conductors can have a portion thereof disposed within that portion of the opening means.

Accordingly, one embodiment of this invention provides a temperature sensor construction comprising a thermistor having opposed sides, a pair of conductors respectively secured to the opposed sides of the thermistor and having portions thereof extending away from the thermistor, an electrically insulating member having opening means therethrough and telescopically receiving the thermistor in the opening means thereof, the insulating member having an outer peripheral edge means, a pair of metallic foil members disposed on the opposed sides of the thermistor and being insulated from each other by the insulating member, and two outer layers of electrically insulating material secured to each other and encapsulating the foil members and the conductors and the insulating member and the thermistor therebetween, the opening means in the insulating member having a portion thereof that extends to and interrupts the peripheral edge means thereof, one of the conductors having a portion thereof disposed within the portion of the opening means.

Accordingly, it is an object of this invention to provide a new temperature sensor construction having one or more of the novel features of this invention as set forth above or hereinafter shown or described.

Another object of this invention is to provide a new method of making such a temperature sensor construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a perspective view illustrating the new temperature sensor construction of this invention.

FIG. 2 is an exploded perspective view illustrating how the foil members of the temperature sensor construction are to be assembled with the outer layers of electrically insulating material.

FIG. 3 illustrates the completed subassembly of FIG. 2.

FIG. 4 is an exploded perspective view illustrating how the subassembly of the thermistor and pair of conductors are to be assembled with the main pair of leads for the temperature sensor construction.

FIG. 5 is an enlarged fragmentary top view of the subassembly of the thermistor and the pair of conductors therefor, FIG. 5 being taken in the direction of the arrows 5—5 of FIG. 4.

FIG. 6 is a fragmentary side view of the structure illustrated in FIG. 5 and is taken in the direction of the arrows 6—6 of FIG. 5.

FIG. 7 is a perspective view of the completed subassembly of FIG. 4.

FIG. 8 is an enlarged, fragmentary, exploded, perspective view illustrating the various parts of the temperature sensor construction of FIG. 1 before the same are assembled together.

FIG. 9 is a view similar to FIG. 8 and illustrates the subassembly of the thermistor and conductor means being disposed in a final position thereof.

FIG. 10 is a fragmentary top view of a portion of the structure illustrated in FIG. 9 and is taken substantially in the direction of the line 10—10 of FIG. 9.

FIG. 11 is a view similar to FIG. 9 and illustrates the insulating member being disposed in place on top of the thermistor and lead means subassembly.

FIG. 12 is a fragmentary top view of the assembled arrangement of FIG. 11.

DESCRIPTION OF THE PREFERRED EMBODIMENT

While the various features of this invention are hereinafter described and illustrated as being particularly adapted to provide a temperature sensor construction for use as an electric motor protector means, it is to be understood that the various features of this invention can be utilized singly or in various combinations thereof to provide a temperature sensor construction for other apparatus as desired.

Therefore, this invention is not to be limited to only the embodiment illustrated in the drawings, because the drawings are merely utilized to illustrate one of the wide variety of uses of this invention.

Referring now to FIG. 1, the new temperature sensor construction of this invention is generally indicated by the reference numeral 20 and is made by the method of this invention in a manner hereinafter set forth from the parts illustrated in FIG. 8 which comprise a thermistor 21, such as a small disc-like pellet of semiconductive material having a selected positive or negative temperature coefficient of resistance, a pair of conductors 22 and 23, a pair of main leads 24 and 25, a pair of conductive metallic foil members 26 and 27, two layers 28 and 29 of electrically insulating material and an electrically insulating member 30.

Since the use and operation of such a temperature sensor construction 20 is well known in the art as set forth in the aforementioned U.S. Pat. Nos. 3,646,494 and 3,521,212, to Waseleski, Jr. et al, which are being incorporated into this disclosure by this reference thereto, only the details of the temperature sensor construction 20 of this invention will now be described.

The thermistor 21 has opposed flat substantially circular sides 31 and 32 and is thereby substantially cylindrical. In one working embodiment of this invention, the thermistor comprises a PTC chip that is approximately 0.110 of an inch in diameter and approximately 0.060 of an inch thick.

The conductors 22 and 23 can be formed of any suitable metallic material and in one working embodiment of this invention each comprises a solid wire of nickel plated grade A nickel-iron material approximately 0.020 of an inch in diameter and being formed with a first portion 33 thereof disposed at an angle of approximately 45° relative to a tail portion 34 thereof, the portion 33 having a substantially flattened end 35 soldered to a respective side 31 or 32 of the thermistor 21. The tail portions 34 of the conductors 22 and 23 are arranged so as to be disposed in spaced apart parallel side-by-side relation through a twisting of the angled portions 33 thereof as illustrated in FIG. 6 at a point beyond the outer peripheral surface of the thermistor 21.

The leads 24 and 25 can be formed of any suitable material and in the embodiment illustrated in the drawings comprises conductive material 37 covered by insulation means 38. However, the adjacent ends 39 of the leads 24 and 25 each has the insulation material 38 thereof removed so as to bare an end 40 of the respective conductor 37 which is adapted to be electrically secured to an end 41 of a respective lead conductor 22 or 23 as illustrated in any suitable manner.

In the one working embodiment of the temperature sensor construction 20 of this invention, each lead 24 and 25 comprises seven strands of twisted wire to form the conductor 37 thereof with teflon forming the insulation 38, the ends 40 of the leads 24 and 25 being ultrasonically welded to the ends 41 of the tail portions 34 of the conductors 22 and 23 in the manner illustrated in FIG. 7 to form a subassembly that is generally indicated by the reference numeral 42 to be subsequently further assembled in a manner hereinafter set forth.

The outer layers 28 and 29 of insulating material actually can comprise a single strip 43 of insulating material having a fold line 44 adapted to form an end 45 of the completed temperature sensor construction 20 illustrated in FIG. 20 after the outer layers 28 and 29 are folded in superimposed relation as indicated by the arrow 46 in FIG. 11 in a manner hereinafter set forth, the strip 43 having heat sealable material 47 disposed on the side 48 thereof so that the folded over layers 28 and 29 can be heat sealed together to encapsulate various parts of the temperature sensor 20 therein as will be apparent hereinafter.

In the one working embodiment of the temperature sensor construction 20 of this invention, the strip 43 comprises a film of polyimide approximately 0.003 of an inch thick having the heat sealable material 47 coated on the side 48 thereof and comprising teflon of approximately 0.001 of an inch thick. In such one working embodiment of the temperature sensor construction 20 of this invention, each layer 28 and 29 is approximately 2.20 of an inch long and approximately 0.750 of an inch wide.

The metallic foil discs 26 and 27 are substantially identical to each other and comprise a substantially circular member having an outer peripheral edge 49 that is interrupted by a slot 50 that is substantially truncated in design and defining an arcuate inner end 51 just short of the center 52 of the respective disc member 26 or 27.

While the metallic foil members 26 and 27 can be formed of any suitable material, the members 26 and 27 in the one working embodiment of the temperature sensor construction 20 of this invention comprise copper foil approximately 0.0008 of an inch thick having pressure sensitive adhesive (not shown) disposed on one side 53 thereof so that the respective member 26 or 27 can be readily attached to the side 48 of the respective member 28 or 29 in the positions illustrated in FIGS. 2 and 3 by a suitable placing die or the like so that the other sides 54 of the members 28 and 29 are exposed to view and form the subassembly 55 with the strip 43 in the manner illustrated in FIG. 3. In this manner the secured members 26 and 27 will have the slots 50 thereof disposed in aligned relation when the layers 28 and 29 are folded together for a purpose hereinafter set forth.

The member 30 has one end 56 that is substantially circular or disc-shaped and another end 57 that comprises a substantially elongated rectangular tongue having opposed parallel sides 58 and 59, the circular end 56 having a substantially circular peripheral edge 60 except for a small tail end 61 as illustrated.

The member 30 has a substantially circular opening 62 passing completely through opposed sides 63 and 64 of the member 30 at approximately the center of the disc end 56 and being of a size to telescopically receive the thermistor 21 therein in a manner hereinafter set forth, the opening 62 of the member 30 having an irregular shaped portion 65 extending to and interrupting the outer peripheral edge 60 thereof adjacent the edge 59 of the tongue portion 57 as best illustrated in FIG. 12 for a purpose hereinafter described.

While the member 30 can be formed of any suitable insulating material, the one working embodiment of the temperature sensor construction 20 of this invention has the member 30 formed of FEP teflon type A sold by the Dupont Company of Wilmington, Delaware as Dupont No. 2000A and being approximately 0.020 of an inch thick.

After all of the parts of the temperature sensor construction 20 of this invention have been formed in the configurations and subassemblies previously set forth, the temperature sensor construction 20 of this invention is formed by the method of this invention by first disposing the subassembly 42 of the thermistor 21 and leads means 22, 23, 24 and 25 on the side 48 of one of the outer layers 28 or 29 with the thermistor 21 being located on the respective conductive foil disc 26 or 27 and having the leads 24 and 25 extend outwardly beyond the free end 66 of that layer 28 or 29, such as in the manner illustrated in FIG. 9 wherein it can be seen that the portion 33 of the conductor 23 is aligned with the slot 50 in the foil disc 26 so as to be out of electrical contact with the foil disc 26. However, the side 32 of the thermistor 21 and the flattened end 35 of the other conductor 22 is fully in engagement with the side 54 of the metallic foil disc 26 as illustrated.

Thereafter, the member 30 is disposed in place by having the disc end 56 thereof disposed over the thermistor 21 so that the thermistor 21 is telescopically received in the circular opening 62 thereof and the tongue 57 extends downwardly between the two tail portions 34 of the conductors 22 and 23 to insulate the same from each other while the portion 33 of the conductor 23 is received in the portion 65 of the opening 62 to permit the member 30 to be disposed substantially flush against the side 48 of the layer 28 in the manner illustrated in FIG. 11.

The layer 29 is then folded over the layer 28 in the manner indicated by the arrow 46 in FIG. 11 to the position illustrated in FIG. 1 where the foil member 27 has its side 54 now disposed in contact with the side 31 of the thermistor 21. However, since the slots 52 in the foil members 26 and 27 are wider than the part 65 of the opening 62, the foil layers 26 and 27 do not short through the part 65 of the opening 62 in this superimposed relation. The superimposed layers 28 and 29 are then heat sealed together to not only heat seal the sides 48 thereof to each other by the layer 47 of thermoplastic material thereof but also to the subassembly 42 and member 30 and as well as to the insulation 38 of the leads 24 and 25 so that the various insulating materials substantially fuse together in the manner illustrated in FIG. 1.

In this manner, it can be seen that the temperature sensor construction 20 of this invention can be formed in a relatively simple manner, such as by automatic machinery since the parts and subassemblies are merely laid in place as previously set forth.

Therefore, it can be seen that this invention not only provides a new temperature sensor construction, but also this invention provides a new method of making such a temperature sensor construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a temperature sensor construction comprising a thermistor having opposed sides, a pair of conductors respectively secured to said opposed sides of said thermistor and having portions thereof extending away from said thermistor, an electrically insulating member having an opening means therethrough and telescopically receiving said thermistor in said opening means thereof, said insulating member having an outer peripheral edge means, a pair of metallic foil members disposed on said opposed sides of said thermistor and being insulated from each other by said insulating member, and two outer layers of electrically insulating material secured to each other and encapsulating said foil members and said conductors and said insulating member and said thermistor therebetween, the improvement wherein said opening means in said insulating member has a portion thereof that extends to and interrupts said peripheral edge means thereof, one of said conductors having a portion thereof disposed within said portion of said opening means.

2. A temperature sensor construction as set forth in claim 1 wherein said insulating member has opposed substantially flat sides respectively facing said two outer layers, the other of said conuctors having a portion thereof disposed against one of said sides of said insulating member and extending to said peripheral edge means thereof.

3. A temperature sensor construction as set forth in claim 2 wherein said insulating member has opposed ends one of which defines a substantially circular disc-like portion having said opening means passing therethrough.

4. A temperature sensor construction as set forth in claim 3 wherein the other of said opposed ends of said insulating member defines a tongue-like portion extending in one direction from said disc-like portion, said conductors respectively having elongated tails extending from said portions thereof and being separated from each other by said tongue-like portion of said insulating member.

5. A temperature sensor construction as set forth in claim 5 wherein said tongue-like portion of said insulating member has opposed substantially parallel peripheral edges throughout the length thereof, said tails of said conductors being respectively disposed in substantially parallel relation with said peripheral edges of said tongue-like portion and outboard of the same.

6. A temperature sensor construction as set forth in claim 1 wherein said metallic foil members each has a peripheral edge means, one of said metallic foil members having a slot means passing therethrough and interrupting said peripheral edge means, said slot means being aligned with said opening means of said insulating member whereby said one metallic foil member is not in electrical contact with said portion of said one conductor.

7. A temperature sensor construction as set forth in claim 6 wherein the other of said metallic foil members has a slot means passing therethrough and interrupting said peripheral edge means thereof, said slot means of said other metallic foil member also being aligned with said opening means of said insulating member.

8. A temperature sensor construction as set forth in claim 1 and further comprising a pair of leads respectively electrically interconnected to said conductors at areas thereof that are disposed between said outer layers and respectively extending to the exterior of said outer layers.

9. A temperature sensor construction as set forth in claim 1 wherein said outer layers respectively comprise folded over parts of a single sheet of electrically insulating material.

10. A temperature sensor construction as set forth in claim 1 wherein said metallic foil members are respectively secured to said two outer layers of electrically insulating material by adhesive means.

11. In a method of making a temperature sensor construction comprising a thermistor having opposed sides, a pair of conductors respectively secured to said opposed sides of said thermistor and having portions thereof extending away from said thermistor, an electrically insulating member having an opening means therethrough and telescopically receiving said thermistor in said opening means thereof, said insulating member having an outer peripheral edge means, a pair of metallic foil members disposed on said opposed sides of said thermistor and being insulated from each other by said insulating member, and two outer layers of electrically insulating material secured to each other and encapsulating said foil members and said conductors and said insulating member and said thermistor therebetween, the improvement comprising the steps of forming said opening means in said insulating member to have a portion thereof that extends to and interrupts said peripheral edge means thereof and forming one of said conductors to have a portion thereof disposed within said portion of said opening means.

12. A method of making a temperature sensor construction as set forth in claim 11 and including the steps of forming said insulating member to have opposed substantially flat sides respectively facing said two outer layers, and forming the other of said conductors to have a portion thereof disposed against one of said sides of said insulating member and extending to said peripheral edge means thereof.

13. A method of making a temperature sensor construction as set forth in claim 12 and including the step of forming said insulating member to have opposed ends one of which defines a substantially circular disc-like portion having said opening means passing therethrough.

14. A method of making a temperature sensor construction as set forth in claim 13 and including the steps of forming the other of said opposed ends of said insulating member to define a tongue-like portion extending in one direction from said disc-like portion and forming said conductors to respectively have elongated tails extending from said portions thereof and be separated from each other by said tongue-like portion of said insulating member.

15. A method of making a temperature sensor construction as set forth in claim 14 and including the steps of forming said tongue-like portion of said insulating member to have opposed substantially parallel peripheral edges throughout the length thereof, and disposing said tails of said conductors respectively in substantially parallel relation with said peripheral edges of said tongue-like portion and outboard of the same.

16. A method of making a temperature sensor construction as set forth in claim 11 and including the steps of forming said metallic foil members to each have a peripheral edge means, forming one of said metallic foil members to have a slot means passing therethrough and interrupting said peripheral edge means, and aligning said slot means with said opening means of said insulating member whereby said one metallic foil member is not in electrical contact with said portion of said one conductor.

17. A method of making a temperature sensor construction as set forth in claim 16 and including the steps of forming the other of said metallic foil members to have a slot means passing therethrough and interrupting said peripheral edge means thereof, and aligning said slot means of said other metallic foil member also with said opening means of said insulating member.

18. A method of making a temperature sensor construction as set forth in claim 11 and including the steps of electrically interconnecting a pair of leads respectively to said conductors at areas thereof that are disposed between said outer layers, and respectively extending said leads to the exterior of said outer layers.

19. A method of making a temperature sensor construction as set forth in claim 11 and including the step of forming said outer layers to respectively comprise folded over parts of a single sheet of electrically insulating material.

20. A method of making a temperature sensor construction as set forth in claim 11 and including the step of securing said metallic foil members respectively to said two outer layers of electrically insulating material with adhesive means.

* * * * *